US005816384A

United States Patent [19]

Hsu

[11] Patent Number: 5,816,384

[45] Date of Patent: Oct. 6, 1998

[54] CUT TYPE WIRE RECEIVER

[76] Inventor: Chiu-Lin Hsu, No.14-1, Kung 8th Road, Kung 2nd Industrial Park, Linkuo Hsiang, Taipei Hsien, Taiwan

[21] Appl. No.: 740,893

[22] Filed: Nov. 4, 1996

[51] Int. Cl.[6] ..................................................... B65G 29/00

[52] U.S. Cl. .................. 198/481.1; 198/457; 414/746.2; 414/746.4

[58] Field of Search ................................ 198/481.1, 457, 198/523; 414/746.2, 746.4, 745.9, 745.7

[56] References Cited

U.S. PATENT DOCUMENTS 1,316,822 9/1919 Yokich .................................... 198/457

3,871,288 3/1975 White .................................... 414/746.4

FOREIGN PATENT DOCUMENTS 217341 12/1968 U.S.S.R. ............................. 414/745.9

*Primary Examiner*—Joseph E. Valenza
*Assistant Examiner*—Khoi H. Tran
*Attorney, Agent, or Firm*—Birch, Stewart, Kolasch & Birch, LLP

[57] ABSTRACT

The present invention relates to a wires receiver, and particularly to a cut type wires receiver mounted on the rear section of output wheel set of cutting stripper; said wires receiver comprising a spline shaft with equal-divided circumference between the shaft blocks on the side of main plate; a follower gear extending between the other two shaft blocks beside the spline shaft, and on the follower gear having a toothed belt extending through the belt notch of main plate to the other side of main plate in connection with the other gear; the gears connected in connection with a step motor, and the motor threaded on the main plate; a wires collector threaded on the main plate below the spline shaft, and the collector having a wires collection part; such wires receiver may receive the wires in the collector when the wires stripped and ejected from the output wheel set of cutting stripper, and rotation of motor may drive the spline shaft in rotation to allow the wires to slide down to the collection part of the collector so as to maintain wires collected in good order and to avoid bare wires ends bending.

1 Claim, 4 Drawing Sheets

CUT TYPE WIRE RECEIVER

BACKGROUND OF THE INVENTION

The present invention relates to a cut type wire receiver which is mounted on the rear operation part of the conventional cutting stripper for effective collection of strands after wire cutting and stripping in facility of quantative bundle packing.

For any circuits connection, the insulating skin on both ends of electric wire must be stripped to provide bare wire for circuits connection. The conventional electric wire stripping must rely on a skillful electrician to make it with his skill but no 100% success is warranted. As electronic industry has moved into a full automation stage, slow speed by manual stripping can not satisfy the need of mass assembly. Thus, electric wire to be provided for connection must be stripped in advance and further be pressed conductive terminals in facility of automatic insertion operation. The stripping and terminal pressing job is finished by a stripping and terminal press. Referring to FIGS. 1A and 1B. it's a machine specially designed for cutting wire and stripping the insulating skin on the end of wire; such wire cutting stripper may cut the wire at various lengths, and strip both ends of wire at proper length. Because it adopts automatic and continuous stripping, its operation speed is very fast with good quality.

Though today there has cutting stripper with excellent cutting and stripping function, however some users indicate the wire products finished by such cutting stripper have been found bare wire ends are bent and wires collected are not well arranged to affect the subsequent bundling. According to the knowledge of the inventor, the cause lies in: the wires 12 finished by the cutting and stripping device 11 of cutting stripper 10 would drop to storage plane 14 of table after ejected from the output wheel set 13; such output of wires may have different negative impact to the wires at different lengths wherein for the wires 15 of shorter length when stripping length between both ends is different arrangement after ejected from the output wheel set 13 will be quite out of order and even short and long stripping ends are arranged in cross manner and this may cause a great trouble to the quantative bundling; because it may need to sort up the long and short ends manually for bundling again it thus increases unnecessary operation process. On the other hand, if for cutting longer wires 16, a stripping end 17 will be hanging down to the storage plane 14 of the machine owing to its dead weight when it is ejected from the output wheel set 13 while the other end 18 held within the output wheel set 13 continues to be ejected; as pushed forward the bent stripping end 17 of the wire will result in the deformation of bare wire 170 on the stripping end when it is pushed to the storage plane 14 of machine. Such result may give a great obstacle to terminal pressing on stripping end because bent bare wire will cause the terminal failing to put on the bare wire. In addition, even if the bare end were not required for terminal pressing, in order for easy insertion of wires, they have to be straightened before bundling and this will result in needing extra labor.

In view of existing cutting stripper having the defect of product as mentioned above, the inventor therefore have successfully designed a wire receiver to match cutting stripper subject to such shortcomings, and said wire receiver has a spline shaft driven by motor which is distributed on the rear section of output wheel set of cutting stripper. With the control of timing running of motor, the spline shaft may turn around at 90 degrees; thus the wires ejected from the output wheel set will enter the slot of spline shaft to fall into the wire collector below the spline shaft as a result of spline shaft turning by 90 degrees to finish wire reception in good order.

DETAILED DESCRIPTION OF THE PREFERRED EMBODIMENT

Figure 1A:
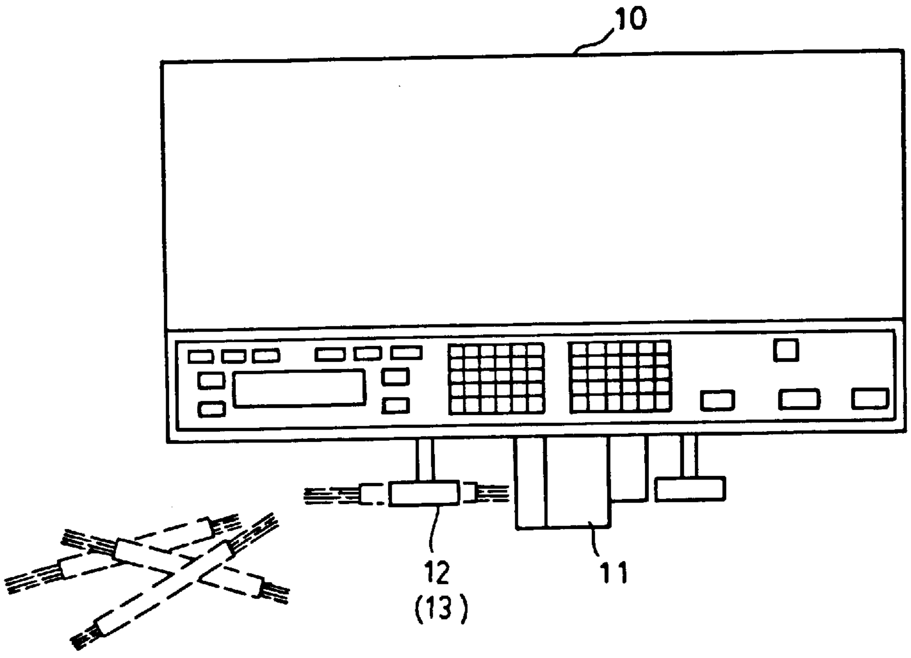
FIGS. 1A and 1B are a view showing the arrangement of products finished by the existing cutting stripper.
Figure 1B:
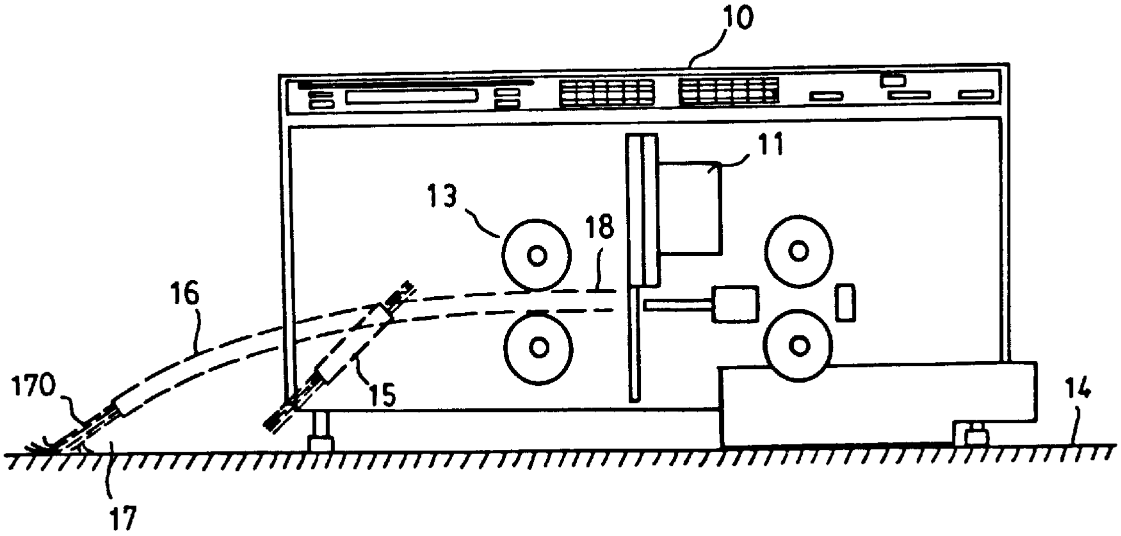
Figure 2:
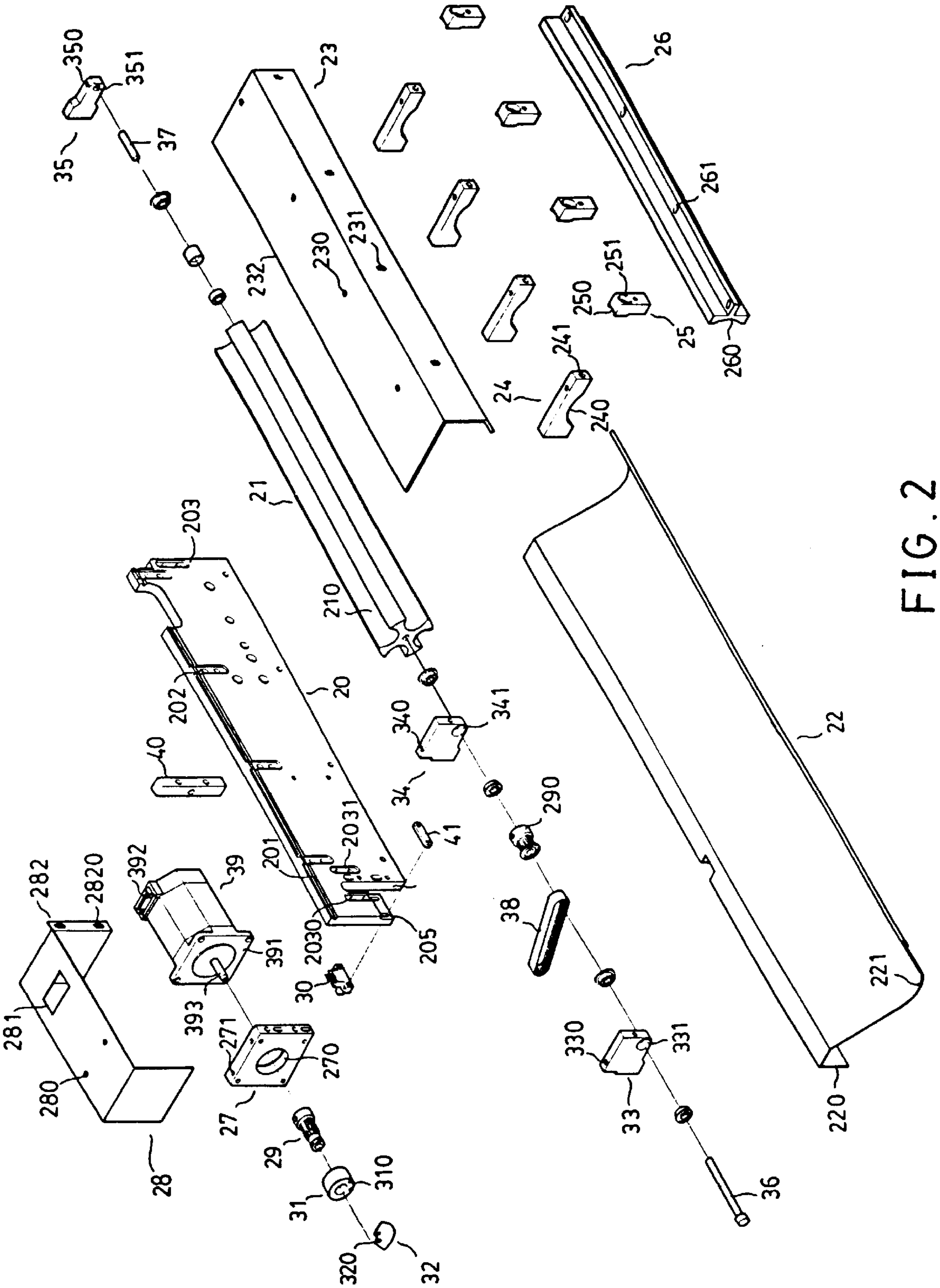
FIG. 2 is a sectional-elevational view of the parts of the present invention.

Referring to FIG. 2, the present invention comprises main plate 20, spline shaft 21, wire collector 22, shaft cover 23, top column 24, front beam 25, front guide plate 26, motor plate 27, motor frame 28, gear 29, sensor 30, front shaft block 31, location sensing piece 32, first, second and third shaft blocks 33, 34 and 35; main plate 20 having a groove 201 near a top side, and a plurality of shallow grooves 202 distributed at equal distance along said groove 201, and a plurality of shallow grooves 203 on the lower row wherein two shallow grooves 2030 and 2031 having a belt notch 204, and on the lower end of shallow groove 2030 having a recess plate 205 horizontally; spline shaft 21 having equal-divided slots 210 around the circumference; wire collector 22 resembling a V hood, and its side end having vertical angle-contact plane 220, and inner recess of the collector forming a wire collection portion 221; shaft cover 23 is an angle-bending plate, and its top plate and side plate having fixing-holes 230, 231 respectively; under the top column 24 having a shaft arc 240, and on the front, rear and top sides having a thread hole 241 respectively; front beam 25 having a recess 250 on one side and location hole 251 on the other side; the front guide plate 26 resembling a T plate with recess arc side 260, and front projection plate having equal-distance thread hole 261; motor plate 27 having shaft block hole 270 on its center, and its plane and side having thread hole 271; motor frame 28 resembling a [] angle plate, having thread hole 280 and retaining hole 281 on the top plane, and having frame plate 282 hanging on the other side, and said frame plate having thread hole 2820; the front shaft block 31 resembling a ring block, having thread hole 310 on one side; location sensing piece 32 having a sector piece with inner ring thread hole 320; the first, second and third shaft blocks 33, 34 and 35 having thread holes 330, 340 and 350, and block with shaft holes 331, 340 and 351 on a corner.

Figure 3:
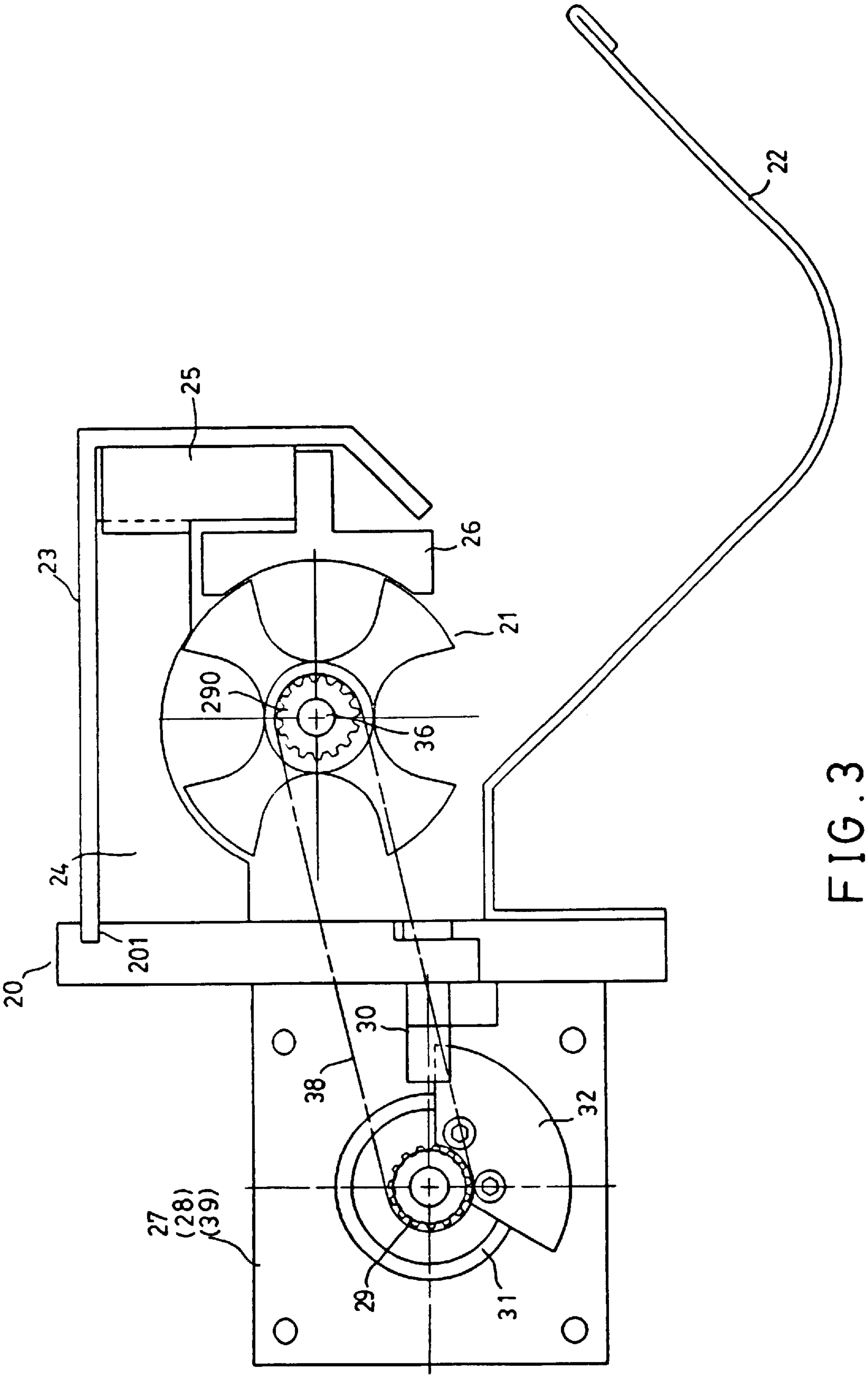
FIG. 3 is a flat view showing the assembly of the present invention.
Figure 4:
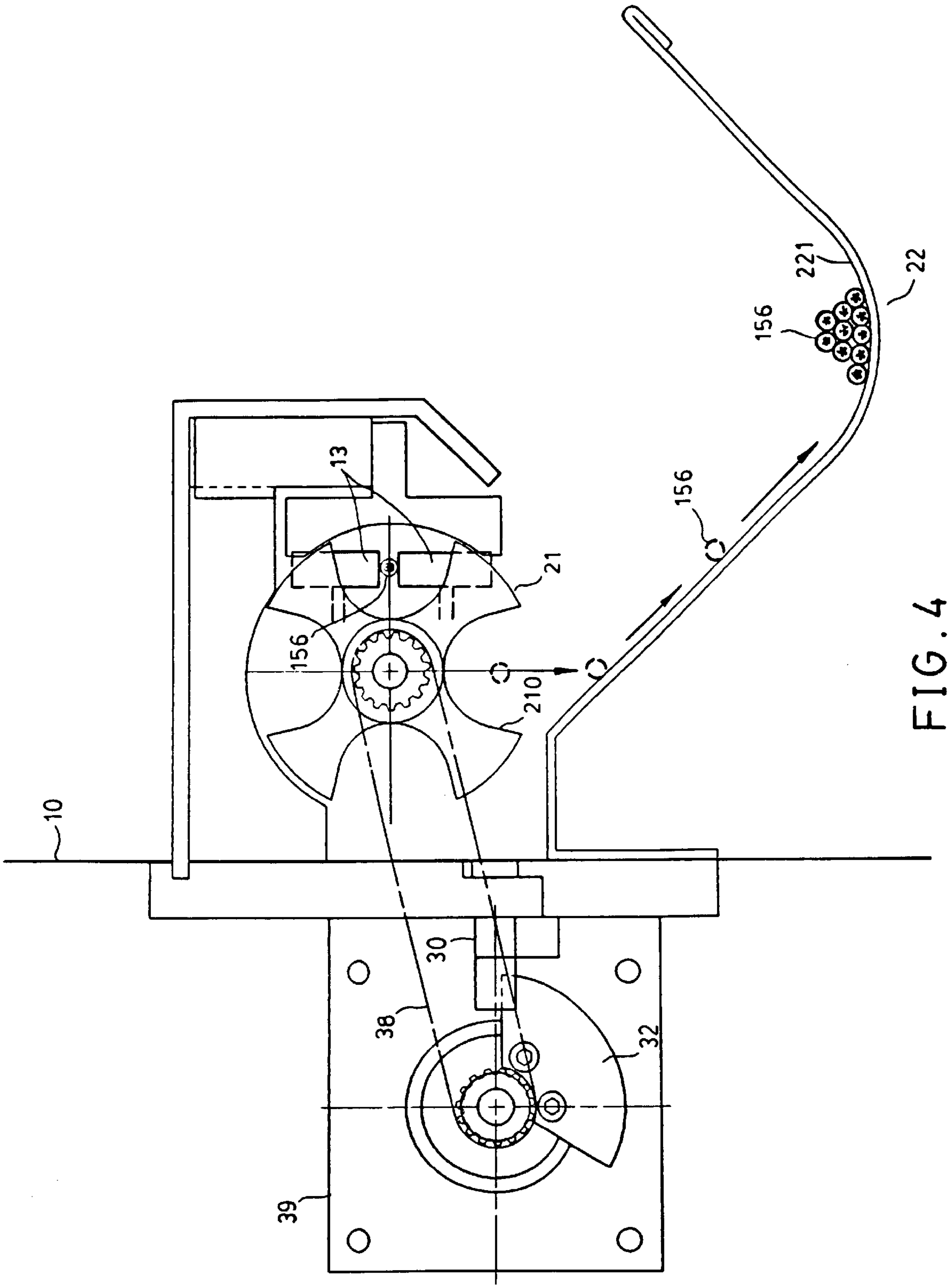
FIG. 4 is a schematic view showing the embodiment of the present invention.

Referring to FIGS. 2 and 3, the top column 24 is threaded on the shallow groove 202 of main plate 20, and the front beam 25 is fitted to front end of the top column 24; the first shaft block 33 is locked up in the shallow groove 2030., and the second shaft block 34 is locked up in the other shallow groove 2031, and the third shaft block 35 is locked up in the near-side shallow groove 203; and spline shaft 21 is mounted around the shaft centers 36, 37 between the second and third shaft blocks 34 and 35, and a follower gear 290 is connected between the first and second shaft blocks 33 and 34, and gear rack has a toothed belt 38 extending through the belt notch 204 of main plate to the other gear 29 on the rear side. Said gear 29 is driven by step motor 39, and said motor uses the front side of motor plate 27 for threading with the output end 391 of motor, and thread hole 280 and retaining hole 281 are threaded beside the motor plate and set in the motor inlaying block 392 respectively, and motor frame plate 282 is secured to the main frame plate 20 by means of motor support beam 40 for fixing step motor 39 to the other side of main plate 20 on the spline shaft 21; a front shaft block 31 extends to the motor shaft center 392 and is rotable within the shaft block hole 270 of motor plate; location sensing piece 32 is threaded beside the front shaft block 31 to accompany the front shaft block in rotation following the motor; a sensor 30 is mounted beside the location sensing piece 32 and said sensor is threaded on the main plate from the recess plate 205 of main plate by means of a bottom fixing piece 41; wires collector 22 is fixed below the spline shaft 21 of main plate by means of angle-contact side 220; the front guide plate 26 is threaded on the bottom of front beam 25 in front of spline shaft 21; shaft cover 33 is set in the groove 201 on the top end of main plate with its top edge 232.

What is claimed is:

1. A cut type wire receiver comprising a spline shaft mounted between a shaft blocks on a main plate, said spline shaft having equal-divided grooves on its circumference: a V wires collector fixed to the spline shaft on the main plate; a follower gear mounted between two shaft blocks on an end of spline shaft, and toothed belt extending through a belt notch on the main plate to a gear on the other side for linking the two gears; the gear on the other side of main plate connecting with a step motor, said step motor threading a motor plate on its output end, and said motor plate then threaded on the main plate; a setting hole of another motor frame covering on a setting block on the top end of motor, and the motor frame plate threading another motor support beam, said support beam then threaded on the main plate; a top end of said spline shaft threading a top column with shaft arc corresponding to a spline shaft arc, a front end of said top column then threading a front beam, and said front beam threading a T guide plate with similar shaft arc to the top column to allow said front guide plate to be located in front of the spline shaft; a bent plate shaft cover, and its top end inserted in a setting groove near top edge of main plate and lateral side threaded beside the front beam.

* * * * *